US008201156B1

(12) United States Patent
Pohorsky et al.

(10) Patent No.: US 8,201,156 B1
(45) Date of Patent: Jun. 12, 2012

(54) AUTOMATIC GENERATION OF MESSAGE IDS

(75) Inventors: Tom Pohorsky, Santa Cruz, CA (US);
Bala Vijayakumar, San Jose, CA (US);
Scott Lee, Bellevue, WA (US);
Srinivasan Ramachandran, Bangalore (IN); Olga Zaigralina, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 1142 days.

(21) Appl. No.: 11/811,273

(22) Filed: Jun. 8, 2007

(51) Int. Cl.
*G06F 9/45* (2006.01)
(52) U.S. Cl. ............ 717/142; 717/100; 704/1; 704/200; 707/758; 709/206; 714/100
(58) Field of Classification Search .................... None
See application file for complete search history.

(56) References Cited

U.S. PATENT DOCUMENTS

| | | | | | |
|---|---|---|---|---|---|
| 5,121,475 | A | * | 6/1992 | Child et al. ................... | 715/201 |
| 5,287,444 | A | * | 2/1994 | Enescu et al. ................. | 715/234 |
| 5,835,918 | A | * | 11/1998 | Walls et al. .................... | 715/236 |
| 5,892,898 | A | * | 4/1999 | Fujii et al. ...................... | 714/57 |
| 6,574,792 | B1 | * | 6/2003 | Easton .......................... | 717/142 |
| 7,024,365 | B1 | * | 4/2006 | Koff et al. .................... | 704/270.1 |
| 7,730,109 | B2 | * | 6/2010 | Rohrs et al. .................... | 707/803 |
| 7,895,607 | B2 | * | 2/2011 | Yao ................................ | 719/320 |
| 2002/0143523 | A1 | * | 10/2002 | Balaji et al. ....................... | 704/8 |
| 2003/0212982 | A1 | * | 11/2003 | Brooks et al. ................ | 717/100 |
| 2004/0083269 | A1 | * | 4/2004 | Cummins ..................... | 709/206 |
| 2004/0158451 | A1 | * | 8/2004 | Mussini ........................... | 704/2 |
| 2006/0101034 | A1 | * | 5/2006 | Murphy et al. ............... | 707/100 |
| 2007/0288488 | A1 | * | 12/2007 | Rohrs et al. .................... | 707/100 |
| 2008/0109738 | A1 | * | 5/2008 | Yao .............................. | 715/760 |

FOREIGN PATENT DOCUMENTS

EP 0875823 A2 * 4/1998

OTHER PUBLICATIONS

D'Cruze et al, "Locale Tutorial", Jan. 26, 2001, Wayback Machine Archived Copy, http://lib.ru/CYRILLIC/locale-tutorial-0_8.text, p. 1-23.*
"Action Request System 5.1 Error Messages Guide", Part No. AR-510-EMG-01, 2001.*

* cited by examiner

*Primary Examiner* — Apu Mofiz
*Assistant Examiner* — Hung Le
(74) *Attorney, Agent, or Firm* — Van Pelt, Yi & James LLP (57) ABSTRACT

Associating a message identifier with a message is disclosed. The message is specified in a program code. It is determined whether the message specified in the program code matches an entry of a message catalog. A message identifier is associated with the message automatically based at least in part on the determination.

51 Claims, 7 Drawing Sheets

AUTOMATIC GENERATION OF MESSAGE IDS

BACKGROUND OF THE INVENTION

Often a message (e.g., status message, error message, log entry, text data for display to a user, etc.) is specified by a programmer in program code. In many cases, the message is transformed later by another person and/or process to approve/improve the readability of the message as well as in some cases to translate the message to other languages for foreign users. Transforming the message is a time consuming process to identify, gather, transform, and implement the message. Therefore there exists a need for a way to more efficiently manage and process messages in program code.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing a message using a message catalog is disclosed. In some embodiments, a message specified in program code is associated with an identifier based at least in part on an entry of a message catalog. In some embodiments, the message specified in program code is associated with the identifier automatically (e.g., without human intervention). For example, a single automatic process determines whether a message specified in a program code matches an entry of a message catalog and associates based at least in part on the determination a message identifier with the message. The program code message can be processed and/or managed using the identifier. An example of the program code message includes a message specified in program code using a function-oriented programming language such as the C programming language. Other examples of the program code include code generated using an object oriented programming language and/or a scripting programming language.

Figure 1:
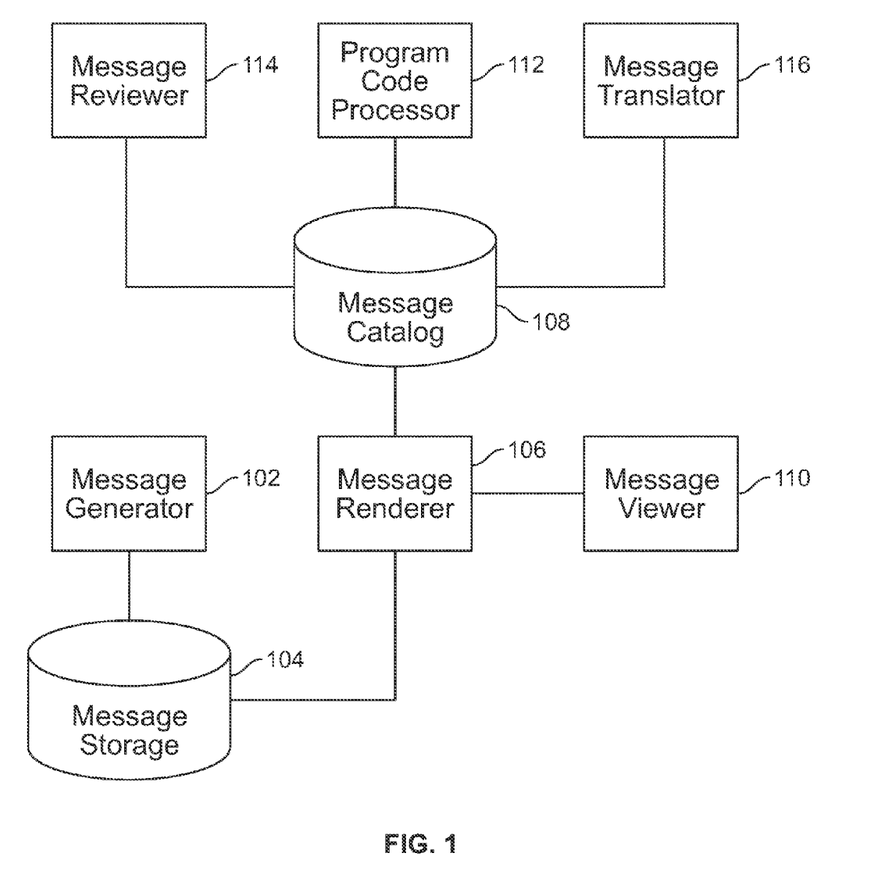
FIG. 1 is a block diagram illustrating an embodiment of a program code message environment.

FIG. 1 is a block diagram illustrating an embodiment of a program code message environment. Message generator 102 generates one or more rendering-format independent message outputs. In some embodiments, message generator 102 executes at least a portion of program code that includes a specification of a message to be generated. For example, using syntax of a programming language, a programmer specifies the message for output when a program/process of the program code is executed. The message output generated by generator 102 is stored in message storage 104. For example, the message output is stored in a log file in storage 104. In some embodiments, the message output is stored in storage 104 not as an end destination but as temporary destination before the generated message output is used render the message in a desired format. For example, an error message to be displayed to a user is temporary stored in message storage 104 before being sent to be rendered for a viewer in a desired language.

Message renderer 106 renders a message output stored in message storage 104. In some embodiments, message renderer 106 renders the message output in response to a request for the message output to be viewed. Rendering the message includes displaying the message in a determined context. Message catalog 108 includes data that can be used to render a message. In some embodiments, foreign language translations of a message are stored in message catalog 108. A plurality of message catalogs may be used. In the example shown, message catalog 108 is used at least in part to render the message. Message catalog 108 is optional. Message viewer 110 is to view the rendered message. Examples of message viewer 110 include a log viewer, a message dialog, and any other interface that can be used to view a rendered message.

Program code processor 112 processes program code to identify and manage messages defined in the program code. For example, one or more messages specified in program code are identified and added to message catalog 108 by processor 112. Message reviewer 114 reviews messages stored in message catalog 108. For example, the messages are reviewed for grammar, spelling, readability, correctness, and/or compliance. Message translator 116 translates one or more messages stored in catalog 108. The translated messages may be stored in catalog 108, another message catalog, and/or in another destination. In various embodiments, program code processor 112, message reviewer 114, and/or message translator 116 are optional.

Figure 2:
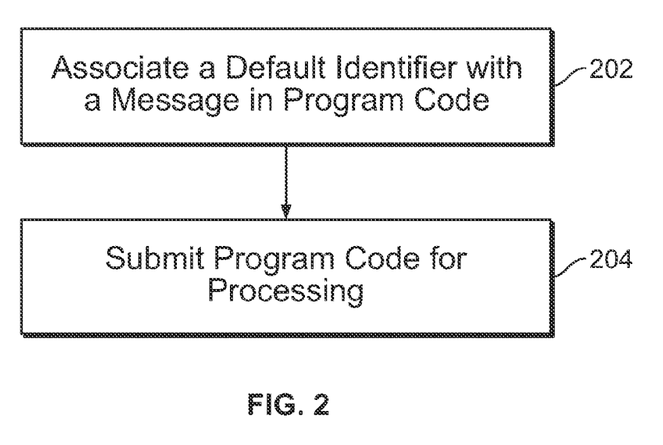
FIG. 2 is flowchart illustrating an embodiment of a process for associating a default message identifier with a message.

FIG. 2 is flowchart illustrating an embodiment of a process for associating a default message identifier with a message. At 202, a default identifier is associated with a message specified in program code. In some embodiments, the message is specified in program code by a specification of a message form and associated metadata. The message form defines the content and/or structure of the message. For example, the message form defines the text to be rendered along with contents of one or more message argument variables, if any. The one or more arguments of the message form allow contents of the argument to be inserted into an output generated using the message form. For example, to display "Hello" with a name of a person dynamically obtained from a program code variable, the following C programming language statement can be used: printf("Hello % s", name). "Hello % s" is the message form and "name" is the argument of the message. When the printf statement is executed, contents of the "name" variable is substituted for the "% s" in the message form.

In some embodiments, the default identifier identifies the message as a new and/or modified message. For example, when a programmer specifies a new message in program code, the programmer includes the default identifier in metadata associated with the message. In some embodiments, the default identifier is used as a placeholder until an appropriate message identifier can be determined for the message. For example, in order to find one or more messages in program code that require message identifier assignment, messages associated with the default identifier are identified. Each identified message is processed to determine a message identifier that can be used to uniquely identify the message and/or a group of related messages that includes the message. The default identifiers are replaced with the determined message identifiers.

In some embodiments, the default message identifier is automatically associated with every new and/or modified message specified in program code. In various embodiments, a user, a process, and/or a program associates the message with the default identifier. At 204, the program code is submitted for processing. In some embodiments, submitting the program code includes checking in the program code to a code managing system such a versioning system that allows a plurality of programmers to collaboratively develop the program code. In some embodiments, submitting the program code for processing includes submitting the program code to program code processor 112 of FIG. 1.

Figure 3:
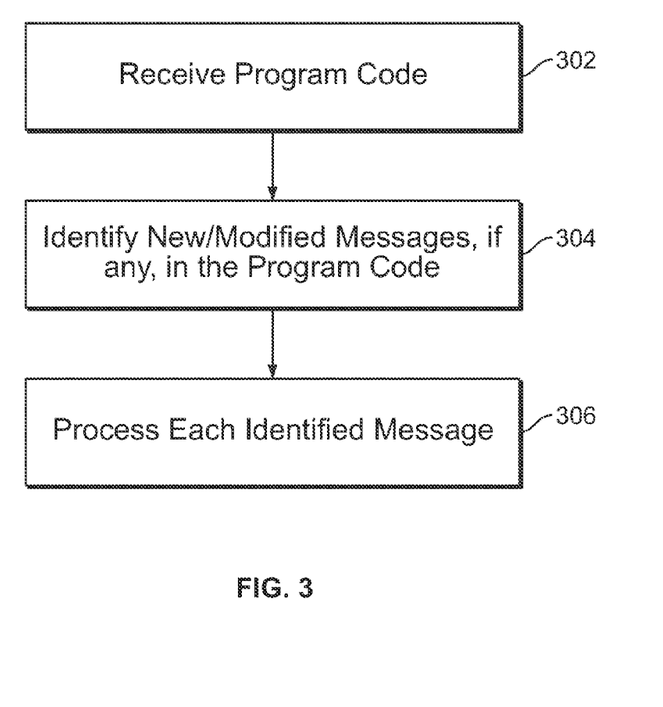
FIG. 3 is flowchart illustrating an embodiment of a process for processing a message in program code.

FIG. 3 is flowchart illustrating an embodiment of a process for processing a message in program code. This process may be implemented in program code processor 112 of FIG. 1. At 302, program code is received. In some embodiments, the received program code is the submitted program code in 204 of FIG. 2. At 304, one or more new and/or modified messages, if any, in the program code are identified. In some embodiments, identifying the new and/or modified messages includes identifying a message included in the program code that is associated with an identifier that identifies a message as new and/or modified. For example, if a program code message is associated with the default identifier in 202 of FIG. 2, the message is identified in 304. In some embodiments, one or more messages that are not already associated with a message identifier are identified as new and/or modified message. In some embodiments, identifying the one or more messages includes comparing the program code with a previous version of the program code to determine new and/or modified messages. At 306, the each identified message is processed. In some embodiments, the processing the identified message includes associating a determined message identifier with the message. In some embodiments, the message identifier can be used to identify unique messages. For example, any two instances of the same message are associated the same message identifier, and any two messages that are different are associated unique message identifiers.

Figure 4:
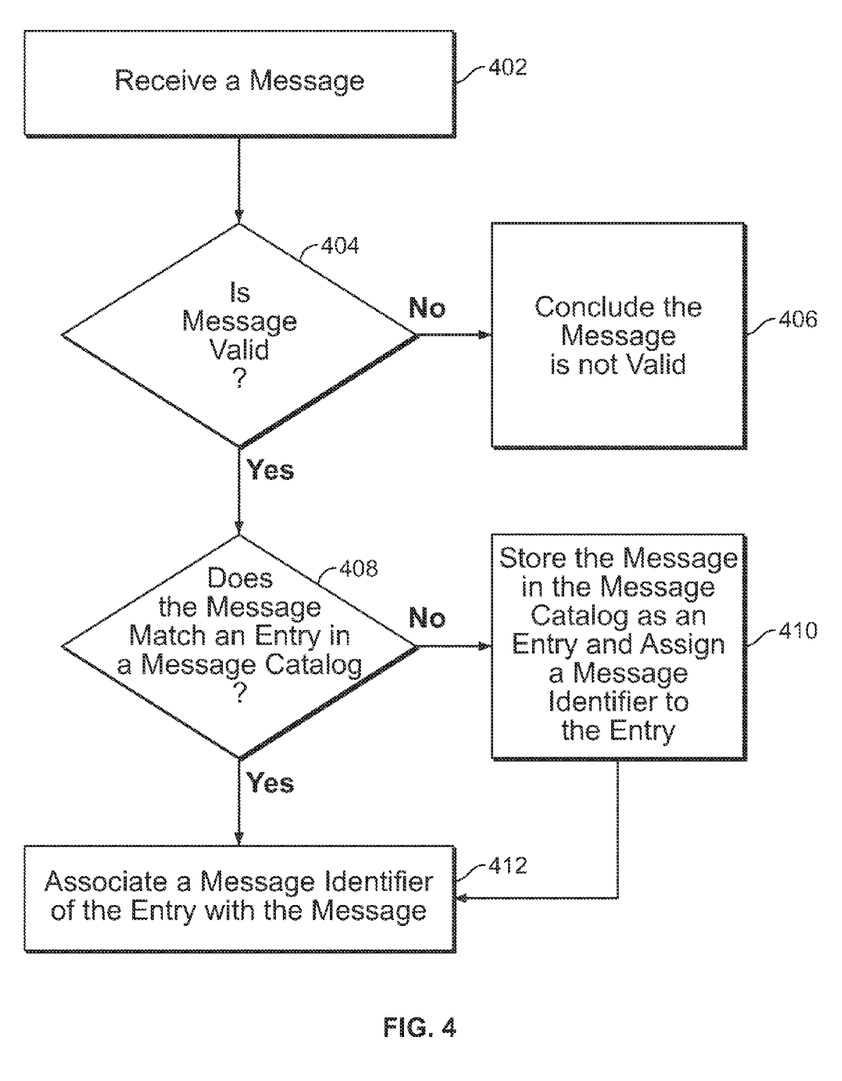
FIG. 4 is a diagram illustrating an embodiment of a process for associating a message identifier with a message.

FIG. 4 is a diagram illustrating an embodiment of a process for associating a message identifier with a message. In some embodiments, the process of FIG. 4 is included in 306 of FIG. 3. At 402, a message is received. In some embodiments, the received message is a message identified as new and/or modified. For example, a message associated with an identifier that identifies the message as new/modified is received. If at 404 the message is determined to not be valid, at 406 it is concluded the message is not valid. In some embodiments, the message is determined to not be valid if the specification (e.g., message form and arguments) of the message does follow one or more rules. For example, the message can be determined to not be valid because the message does not follow a programming language semantic rule for specifying a message. In some embodiments, concluding the message is not valid includes generating an error message. If at 404 the message is determined to be valid, at 408 the message is attempted to be matched with an entry in a message catalog. In some embodiments, the message catalog is message catalog 108 of FIG. 1. In some embodiments, matching the entry includes searching the message catalog for an entry that is associated with the message form of the received message. In some embodiments, performing 404 and/or 406 is optional.

In some embodiments, an entry in the message catalog includes one or more of the following: a message identifier, a message form, message argument data, a message approval status indicator, an identifier associated with origination of the message, an identifier of a message creator, an identifier of a message reviewer, and an error status indicator. In some embodiments, the message catalog is a centralized repository of messages that enables centralized management. Messages can be processed, reviewed, and associated together other messages in an efficient manner using the message catalog. For example, by centralizing message management, processing performed for a message does not need to be duplicated for another instance of the same message. In some embodiments, the message catalog is shared amongst a plurality of users and organizations across a plurality of projects. In some embodiments, a message identifier included in a message catalog entry can be used to obtain an associated entry in another message catalog. For example, a foreign language translation of a message form of a message catalog entry can be obtained by using a message identifier of the message catalog entry to lookup an entry in another message catalog that includes the desired translation. In some embodiments, the message identifier is the message identifier in 412 of FIG. 4.

If at 408 the message does not match any entry in the message catalog, at 410, at least a portion of the received message is stored in the message catalog as a new entry, and the new entry is assigned a new message identifier. The message identifier can be used to uniquely identify the received message and any other message (e.g., foreign language translation of the message) associated with the received message. In some embodiments, if the message is a message modified from a prior message specification, an entry in the message catalog associated with the prior message specification is obtained and modified with appropriate changes reflect the modified message. If at 408 a matching entry in the message catalog is found or the new message catalog entry has been created in 410, the process proceeds to 412. At 412, a message identifier of the matched message catalog entry or the newly created or modified message catalog entry is associated with the received message. In some embodiments, associating the message identifier includes including the message identifier in a metadata of the message specified in program code. For example, a default identifier included the metadata of the program code message is replaced with the determined message identifier. In some embodiments, when the message is later processed to be outputted and/or displayed, the message identifier is used at least in part to output and/or display the message.

Figure 5:
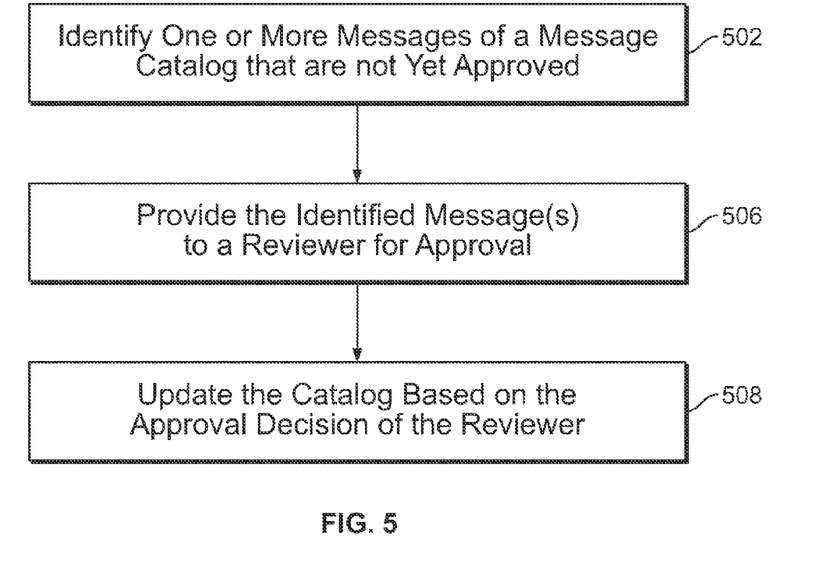
FIG. 5 is a flowchart illustrating an embodiment of a process for reviewing one or more messages in a message catalog.

FIG. 5 is a flowchart illustrating an embodiment of a process for reviewing one or more messages in a message catalog. In some embodiments, the process of FIG. 5 is implemented in message reviewer 114 of FIG. 1. For example, a supervisor may wish to review one or more messages specified in program code to approve and/or enhance the readability of the messages. A message catalog can be used to enable the supervisor to easily review and/or modify messages specified in program code. At 502, one or more messages of a message catalog that are not yet approved are identified. In some embodiments, the message catalog includes message catalog 108 of FIG. 1. In some embodiments, identifying the not approved messages includes searching the message catalog to identify one or more entries in the message catalog that are associated with an indicator that indicates the entry has not yet been approved. In some embodiments, the messages are one or more of the messages identified in 304 of FIG. 3. A message is not yet approved if an appropriate entity has not reviewed and/or verified the message. At 504, the identified messages are provided to a reviewer for approval. In some embodiments, providing the message includes using a message catalog entry associated with the identified message to display the message to the reviewer. Using a provided message, the reviewer is able to view, edit, comment, and/or label the message. In some embodiments, the reviewer is a user with a required authorization/authentication to review the messages. In some embodiments, reviewing the message includes reviewing the message for grammar, spelling, readability, correctness, and/or compliance.

At 506, the message catalog is updated based on an approval decision of the reviewer. Updating the message catalog includes updating a status indicator included a message catalog entry associated with the message of the decision. For example, a "pending" status indicator can either be updated as "approved" or "not approved." In some embodiments, an identification of the reviewer is included in a reviewed message catalog entry. In some embodiments, a message is modified by the reviewer before the message is approved. For example, the reviewer modifies a message form included in a message catalog entry. In some embodiments, if a message is not approved, a message catalog entry associated with the message is marked as "not approved" and/or an administrator (e.g., creator) of the message is notified the message is not approved. In some embodiments, only messages that have been approved are allowed to be displayed and/or outputted by a program complied from program code that includes the specification of the messages.

Figure 6:
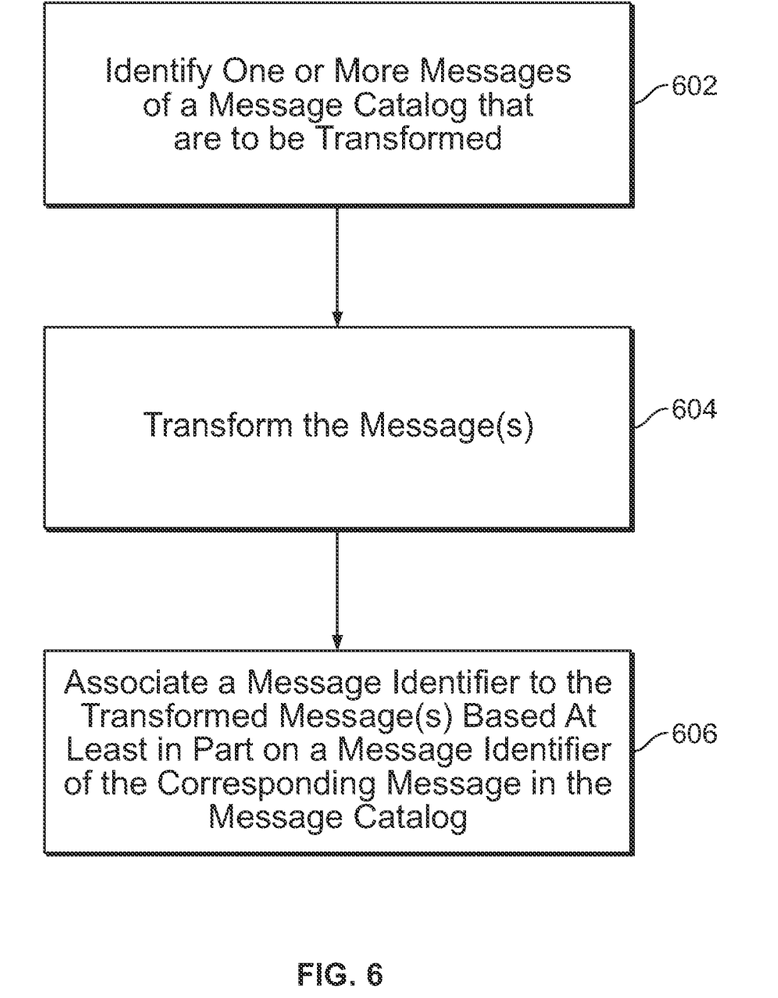
FIG. 6 is a flowchart illustrating an embodiment of a process for transforming one or more messages.

FIG. 6 is a flowchart illustrating an embodiment of a process for transforming one or more messages. In some embodiments, the process of FIG. 6 is at least in part implemented by message translator 116 of FIG. 1. For example, by using a message catalog, transformations of the messages can be efficiently tracked and managed. In some embodiments, transforming the message includes translating the message. At 602, one or more messages of a message catalog that are to be transformed are identified. In some embodiments, the message catalog includes message catalog 108 of FIG. 1. In some embodiments, identifying the messages includes identifying one or more identifiers associated with messages desired to be transformed. At 604, the identified messages are transformed. In some embodiments, transforming the message includes translating a message form of the message to one or more foreign languages. The translation may be performed by a user and/or an automatic process. At 606, a message identifier is associated with the transformed messages based at least in part on a message identifier of the corresponding message in the message catalog. For example, the same message identifier of the corresponding message in the message catalog is assigned to the transformed message. In some embodiments, the transformed message is stored in the message catalog. For example, a translated message form is added to a message catalog entry. In some embodiments, the transformed message is stored in a different message catalog from the message catalog of the identified messages.

Figure 7:
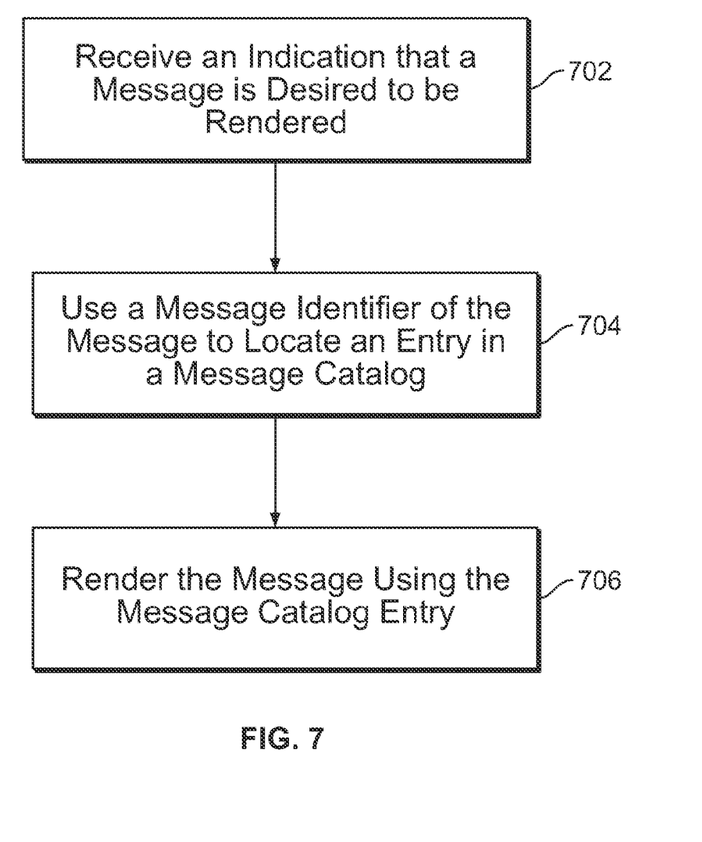
FIG. 7 is a flowchart illustrating an embodiment of a process for rendering a message.

FIG. 7 is a flowchart illustrating an embodiment of a process for rendering a message. In some embodiments, the process of FIG. 7 is implemented in message render 106 of FIG. 1. At 702, an indication is received that a message is desired to be rendered. In some embodiments, the indication specifies a desire to perform one or more of the following: log an event, display a status message, display an alert message, display an error message, write a message to a file, and display a message to a user. In some embodiments, the indication was generated in response to a computer program/process event. In some embodiments, the indication is associated with a request to view and/or display on an interface an output generated using a program code message. For example, an indication that a log file is desired to be viewed is received. At 704, a message identifier of the message is used to locate an entry in a message catalog. In some embodiments, the message identifier is included in a program code specification of the message. In some embodiments, the message identifier is the message identifier in 412 of FIG. 4. In some embodiments, the message catalog includes message catalog 108 of FIG. 1. Locating the entry includes searching the message catalog for the message catalog entry associated with the message identifier. In some embodiments, if an entry is not found, an error is generated.

At 706, the message rendered using the message catalog entry. In some embodiments, rendering message includes using a message form included in the message catalog entry to display at least a portion of the message to user. In some embodiments, the rendering is performed by a process/application separate from the process/application that generated the message output. For example, a rendering format independent output generated using the message is used to render the message in a later determined rendering context. In some embodiments, the context is determined using information associated with a viewer of the message. The context information can be determined automatically and/or specified by the viewer. For example, a rendering language associated with the viewer is determined using an explicit specification of a viewer's language preference included in a source such as a profile or a received preference, and/or the rendering language is determined using an implicit data such a geographical location of the viewer. In some embodiments, the context is determined at a time after the message output was generated. For example, the context is determined in response to receiving the indication to render the message. In some embodiments, the context is determined using one or more environment variables such as time, date, day of week, weather, other data that can used as a reference.

In some embodiments, rendering the message includes using a message identifier and an identifier of the rendering context to obtain an entry in a message catalog containing the message in the desired rendering format. If the desired rendering format is not available, an error is generated and/or a default rendering format is provided. In some embodiments, there exist a plurality of message catalogs, and a determination of which message catalog to use is based at least in part on the message identifier and/or the context identifier. For example, the context identifier is used to select a specific message catalog, and the message identifier is used to identify an entry in the selected catalog. The message catalog includes one or more messages based at least in part on one or more messages specified in program code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of associating a message identifier with a message, comprising:
    determining whether a message specified in a program code matches an entry of a message catalog, wherein the message catalog comprises a centralized repository of messages that enables centralized management, wherein determining whether the message matches an entry of the message catalog includes determining whether the message is another instance of a message associated with that entry; and
    associating automatically, based at least in part on the determination, a message identifier with the message including replacing a default identifier of the message identifying the message as a new or modified message with the message identifier associated with the matching entry of the message catalog.

2. A method as recited in claim 1, wherein the message catalog is associated with a plurality of users.

3. A method as recited in claim 1, wherein a plurality of users uses the message catalog to associate the message identifier with a plurality of instances of the message.

4. A method as recited in claim 1, wherein a plurality of users uses the message catalog to associate a respective message identifier with a plurality of messages.

5. A method as recited in claim 1, wherein the message catalog is shared amongst a plurality of users across a plurality of program code projects.

6. A method as recited in claim 1, wherein the message catalog includes a plurality of entries associated with a plurality of messages.

7. A method as recited in claim 1, wherein the message is specified in the program code using a function-oriented programming language.

8. A method as recited in claim 1, wherein a specification of the message in the program code includes a message form and metadata.

9. A method as recited in claim 8, wherein the message form defines a text to be rendered with contents of one or more message arguments variables.

10. A method as recited in claim 1, wherein the message has been identified as a new or modified message.

11. A method as recited in claim 1, wherein the message identifier can be used to identify a message catalog entry associated with the message.

12. A method as recited in claim 1, wherein an entry of the message catalog includes one or more of the following: the message identifier, a message form of the message, message argument data of the message, a message approval status indicator, an identifier associated with an origination of the message, an identifier of a creator of the message, an identifier of a reviewer of the message, and an error status indicator of the message.

13. A method as recited in claim 1, wherein the program code has been checked into a code managing system.

14. A method as recited in claim 13, wherein the code managing system allows a plurality of users to collaboratively develop the program code.

15. A method as recited in claim 13, wherein the code managing system processes the program code to identify the message as a new or modified message.

16. A method as recited in claim 1, wherein determining whether the message is specified in the program code includes searching the message catalog for the matching message catalog entry.

17. A method as recited in claim 1, wherein if it is determined that the message does not match an entry of the message catalog, a new entry is added to the message catalog based on at least a portion of the message.

18. A method as recited in claim 17, wherein the new entry includes a message form of the message.

19. A method as recited in claim 17, wherein the new entry is associated with an identifier that can be at least in part used to uniquely identify the new entry.

20. A method as recited in claim 19, wherein the message identifier is based at least in part the identifier of the new entry.

21. A method as recited in claim 17, wherein the new entry is provided to a reviewer for approval.

22. A method as recited in claim 21, wherein reviewing the entry includes performing one or more of the following: editing the message, commenting on the message, and labeling the message.

23. A method as recited in claim 1, wherein if it is determined that the message is a modified message associated with a message catalog entry of a previous version of the message, the message catalog entry of the previous version is modified using the message.

24. A method as recited in claim 1, wherein if it is determined that the message matches an entry of the message catalog, the matched entry is at least in part used to associate the message identifier with the message.

25. A method as recited in claim 24, wherein the matched entry is used to translate the message to another language.

26. A method as recited in claim 25, wherein the translation of the message is associated with an identifier determined based at least in part on the message identifier.

27. A method as recited in claim 1, wherein associating the message identifier with the message includes including the message identifier in metadata of the message.

28. A method as recited in claim 1, further comprising rendering the message at least in part by using the message identifier.

29. A method as recited in claim 28, wherein the message identifier and a determined context are used to identify a message catalog entry that is used to render the message.

30. A method as recited in claim 1, further comprising using the message identifier to obtain a translation of the message.

31. A system for associating a message identifier with a message, comprising:
    a processor configured to determine whether a message specified in a program code matches an entry of a message catalog, wherein the message catalog comprises a centralized repository of messages that enables centralized management, wherein to determine whether the message matches an entry of the message catalog includes determining whether the message is another instance of a message associated with that entry, and associate automatically, based at least in part on the determination, a message identifier with the message including replacing a default identifier of the message identifying the message as a new or modified message with the message identifier associated with the matching entry of the message catalog; and a memory coupled with the processor, wherein the memory is configured to provide the processor with instructions.

32. A system as recited in claim 31, wherein a plurality of users uses the message catalog to associate the message identifier with a plurality of instances of the message.

33. A system as recited in claim 31, wherein the message catalog is shared amongst a plurality of users across a plurality of program code projects.

34. A system as recited in claim 31, wherein the message catalog includes a plurality of entries associated with a plurality of messages.

35. A system as recited in claim 31, wherein the message is specified in the program code using a function-oriented programming language.

36. A system as recited in claim 31, wherein the message identifier can be used to identify a message catalog entry associated with the message.

37. A system as recited in claim 31, wherein an entry of the message catalog includes one or more of the following: the message identifier, a message form of the message, message argument data of the message, a message approval status indicator, an identifier associated with an origination of the message, an identifier of a creator of the message, an identifier of a reviewer of the message, and an error status indicator of the message.

38. A system as recited in claim 31, wherein the program code has been checked into a code managing system.

39. A system as recited in claim 38, wherein the code managing system allows a plurality of users to collaboratively develop the program code.

40. A system as recited in claim 38, wherein the code managing system processes the program code to identify the message as a new or modified message.

41. A system as recited in claim 31, wherein if it is determined that the message does not match an entry of the message catalog, a new entry is added to the message catalog based on at least a portion of the message.

42. A system as recited in claim 31, wherein if it is determined that the message is a modified message associated with a message catalog entry of a previous version of the message, the message catalog entry of the previous version is modified using the message.

43. A system as recited in claim 31, wherein if it is determined that the message matches an entry of the message catalog, the matched entry is at least in part used to associate the message identifier with the message.

44. A system as recited in claim 43, wherein the matched entry is used to translate the message to another language.

45. A system as recited in claim 44, wherein the translation of the message is associated with an identifier determined based at least in part on the message identifier.

46. A computer program product for associating a message identifier with a message, the computer program product being embodied in a computer readable medium and comprising computer instructions for:

determining whether a message specified in a program code matches an entry of a message catalog, wherein the message catalog comprises a centralized repository of messages that enables centralized management, wherein determining whether the message matches an entry of the message catalog includes determining whether the message is another instance of a message associated with that entry; and associating automatically based at least in part on the determination a message identifier with the message including replacing a default identifier of the message identifying the message as a new or modified message with the message identifier associated with the matching entry of the message catalog.

47. A computer program product as recited in claim 46, wherein a plurality of users uses the message catalog to associate the message identifier with a plurality of instances of the message.

48. A computer program product as recited in claim 46, wherein the program code has been checked into a code managing system.

49. A computer program product as recited in claim 48, wherein the code managing system allows a plurality of users to collaboratively develop the program code.

50. A computer program product as recited in claim 46, wherein the code managing system processes the program code to identify the message as a new or modified message.

51. A computer program product as recited in claim 46, wherein if it is determined that the message does not match an entry of the message catalog, a new entry is added to the message catalog based on at least a portion of the message.

* * * * *